US010074832B2

(12) United States Patent
Hong et al.

(10) Patent No.: US 10,074,832 B2
(45) Date of Patent: Sep. 11, 2018

(54) METHOD OF MANUFACTURING POUCH-SHAPED BATTERY CELL HAVING SEALED PORTION INSULATED WITH CURABLE MATERIAL

(71) Applicant: LG CHEM, LTD., Seoul (KR)

(72) Inventors: Eun Pyo Hong, Daejeon (KR); Jong Woon Choi, Daejeon (KR); Hyung Ku Yun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 155 days.

(21) Appl. No.: 14/764,293

(22) PCT Filed: Apr. 18, 2014

(86) PCT No.: PCT/KR2014/003415
§ 371 (c)(1),
(2) Date: Jul. 29, 2015

(87) PCT Pub. No.: WO2014/200176
PCT Pub. Date: Dec. 18, 2014

(65) Prior Publication Data

US 2016/0087252 A1 Mar. 24, 2016

(30) Foreign Application Priority Data

Jun. 12, 2013 (KR) ........................ 10-2013-0066922

(51) Int. Cl.
*H01M 2/08* (2006.01)
*H01M 10/04* (2006.01)
(Continued)

(52) U.S. Cl.
CPC ........... *H01M 2/08* (2013.01); *H01M 2/0202* (2013.01); *H01M 10/0436* (2013.01);
(Continued)

(58) Field of Classification Search
None
See application file for complete search history.

(56) References Cited

U.S. PATENT DOCUMENTS 4,340,707 A * 7/1982 Quis ........................ C09D 4/00 428/424.4
7,066,086 B1 * 6/2006 Endo ........................ B41F 31/08 101/114
(Continued)

FOREIGN PATENT DOCUMENTS

CN 101807713 A 8/2010
JP 2010-205420 A 9/2010
(Continued)

OTHER PUBLICATIONS

International Search Report, issued in PCT/KR2014/003415, dated Jul. 24, 2014.

*Primary Examiner* — Alix E Eggerding
(74) *Attorney, Agent, or Firm* — Birch, Stewart, Kolasch & Birch, LLP

(57) ABSTRACT

Disclosed herein is a method of manufacturing a battery cell having a structure in which an electrode assembly including a positive electrode, a separator, and a negative electrode is mounted in a battery case, and the battery case is sealed by thermal welding, the method including (a) mounting the electrode assembly in a receiving part of the battery case and forming sealed portions at an outer edge of the receiving part by thermal welding, (b) perpendicularly bending the sealed portions and bringing the bent sealed portions into contact with an outer side wall of the receiving part, (c) mounting and fixing the battery case processed at step (b) in a jig provided with a depressed part having a size corresponding to that of the battery case, and (d) injecting a curable material into a space defined between the outer side wall of the receiving part of the battery case and an inner side wall
(Continued)

170
100
180
160
161
150 of the depressed part of the jig and curing the injected curable material.

17 Claims, 3 Drawing Sheets

(51) Int. Cl.
*H01M 2/02* (2006.01)
*H01M 10/0525* (2010.01)

(52) U.S. Cl.
CPC ...... *H01M 10/0525* (2013.01); *H01M 2/0212* (2013.01); *H01M 2220/30* (2013.01)

(56) References Cited

U.S. PATENT DOCUMENTS

2007/0154799 A1* 7/2007 Yoon .................. H01M 2/1005 429/176
2009/0104243 A1* 4/2009 Utkhede ............... A61F 9/0017 424/423
2009/0186254 A1* 7/2009 Murray .................... C08G 8/10 429/514
2009/0191448 A1 7/2009 Yamamoto et al.
2010/0209764 A1 8/2010 Heo et al.
2010/0310911 A1 12/2010 Yamamoto et al.
2012/0121944 A1 5/2012 Yamamoto et al.
2013/0216896 A1* 8/2013 Kim .................... H01M 2/0275 429/163
2014/0363730 A1* 12/2014 Ochiai ................ H01M 2/0262 429/176

FOREIGN PATENT DOCUMENTS

JP 2010-282795 A 12/2010
JP 2012-119290 A 6/2012
KR 10-2008-0082724 A 9/2008
KR 10-2009-0083874 A 8/2009
KR 10-2010-0094174 A 8/2010
KR 10-2011-0044954 A 5/2011

* cited by examiner

【FIG. 1】
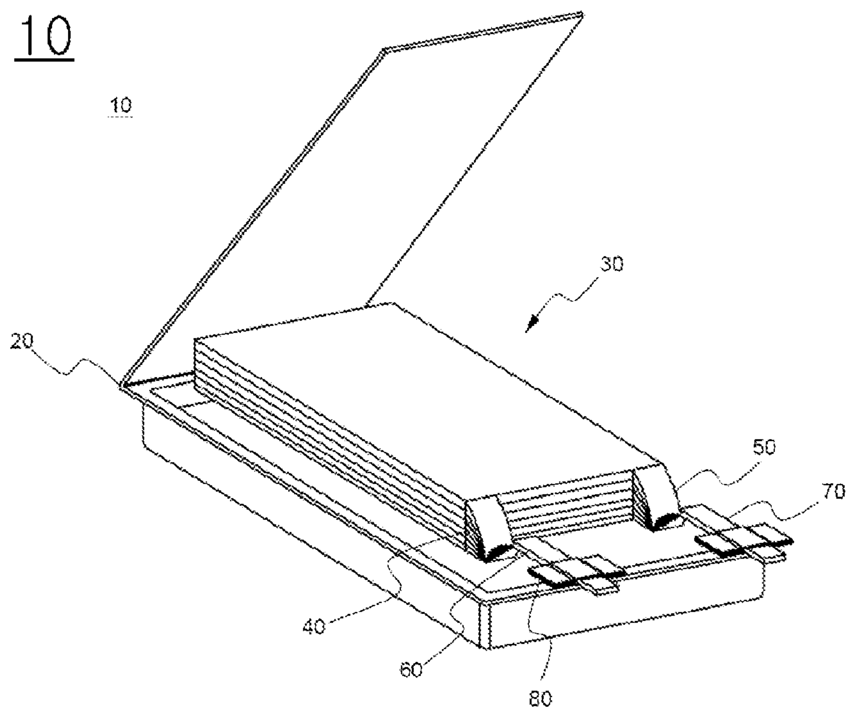
【FIG. 2】
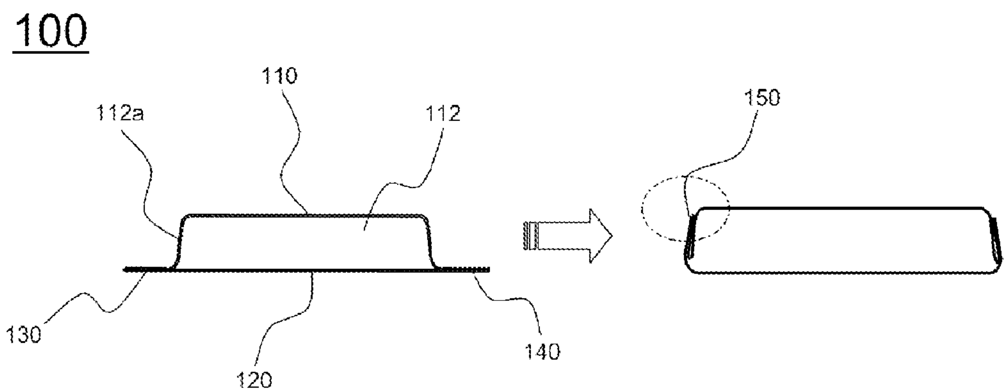

【FIG. 3】
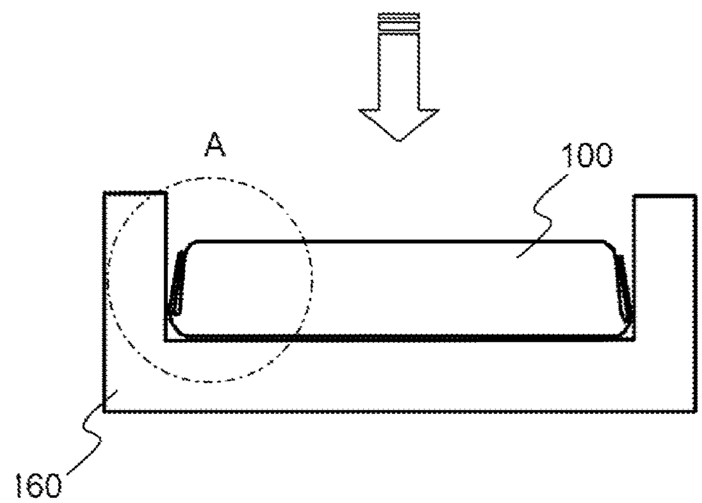
【FIG. 4】
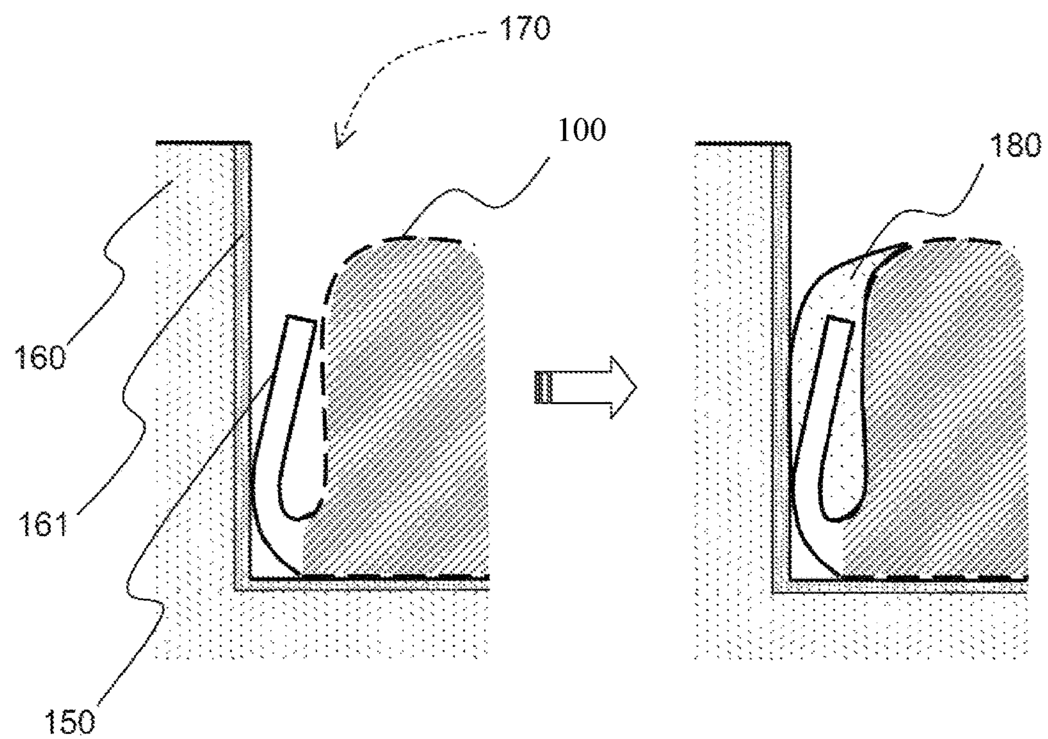

【FIG. 5】
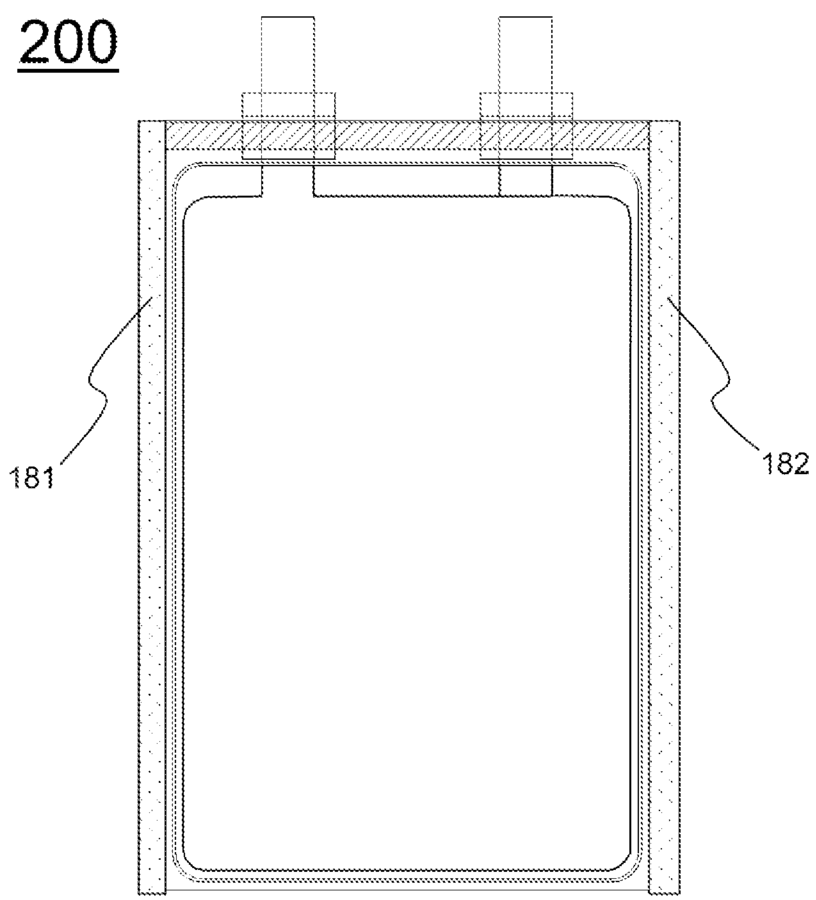

METHOD OF MANUFACTURING POUCH-SHAPED BATTERY CELL HAVING SEALED PORTION INSULATED WITH CURABLE MATERIAL

TECHNICAL FIELD

The present invention relates to a method of manufacturing a battery cell, and more particularly to a method of manufacturing a battery cell including mounting an electrode assembly in a receiving part of a battery case and forming sealed portions at an outer edge of the receiving part by thermal welding, perpendicularly bending the sealed portions and bringing the bent sealed portions into contact with an outer side wall of the receiving part, mounting and fixing the battery case processed at the preceding step in a jig provided with a depressed part having a size corresponding to that of the battery case, and injecting a curable material into a space defined between the outer side wall of the receiving part of the battery case and an inner side wall of the depressed part of the jig and curing the injected curable material.

BACKGROUND ART

In recent years, secondary batteries have been increasingly used. In terms of the shape of batteries, the demand for prismatic secondary batteries or pouch-shaped secondary batteries, which are thin enough to be applied to products, such as mobile phones, is very high. In terms of the material for batteries, on the other hand, the demand for lithium secondary batteries, such as lithium ion batteries and lithium ion polymer batteries, which exhibit high energy density, discharge voltage, and output stability, is very high.

In addition, secondary batteries may be classified based on the structure of an electrode assembly having a positive electrode/separator/negative electrode structure. For example, the electrode assembly may be configured to have a jelly-roll (wound) type structure in which a long sheet type positive electrode and a long sheet type negative electrode are wound while a separator is disposed between the positive electrode and the negative electrode, a stacked type structure in which pluralities of positive electrodes and negative electrodes having a predetermined size are sequentially stacked while separators are disposed respectively between the positive electrodes and the negative electrodes, or a stacked/folded type structure in which predetermined numbers of positive electrodes and negative electrodes are sequentially stacked while separators are disposed respectively between the positive electrodes and the negative electrodes to constitute a bi-cell or a full-cell and then a plurality of bi-cells or full-cells is folded using a separation film.

In recent years, much interest has been taken in a pouch-shaped battery configured to have a structure in which such a stacked or stacked/folded type electrode assembly is mounted in a pouch-shaped battery case made of an aluminum laminate sheet because of low manufacturing costs, light weight, easy modification in shape, etc. In addition, the use of such a pouch-shaped battery has gradually increased.

FIG. 1 is an exploded perspective view typically showing a general structure of a conventional representative pouch-shaped secondary battery.

Referring to FIG. 1, a pouch-shaped secondary battery 10 includes an electrode assembly 30, electrode tabs 40 and 50 extending from the electrode assembly 30, electrode leads 60 and 70 connected respectively to the electrode tabs 40 and 50 by welding, and a battery case 20 for receiving the electrode assembly 30.

The electrode assembly 30 is a power generating element including positive electrodes and negative electrodes sequentially stacked while separators are disposed respectively between the positive electrodes and the negative electrodes. The electrode assembly 30 is configured to have a stacked type structure or a stacked/folded type structure. The electrode tabs 40 and 50 extend from corresponding electrode plates of the electrode assembly 30. The electrode leads 60 and 70 are electrically connected to the electrode tabs 40 and 50, extending from the corresponding electrode plates of the electrode assembly 30, respectively, for example, by welding. The electrode leads 60 and 70 are partially exposed outward from the battery case 20. In addition, insulating films 80 for improving sealability between the battery case 20 and the electrode leads 60 and 70 and, at the same time, securing electrical insulation between the battery case 20 and the electrode leads 60 and 70 are partially attached to the upper and lower surfaces of the electrode leads 60 and 70.

The battery case 20 is made of an aluminum laminate sheet. The battery case 20 has a space defined therein to receive the electrode assembly 30. The battery case 20 is formed generally in the shape of a pouch. In a case in which the electrode assembly 30 is a stacked type electrode assembly as shown in FIG. 1, the inner upper end of the battery case 20 is spaced apart from the electrode assembly 30 such that the positive electrode tabs 40 and the negative electrode tabs 50 can be coupled to the electrode leads 60 and 70, respectively.

For the pouch-shaped battery with the above-stated construction, however, at the step of receiving the electrode assembly in the battery case made of the laminate sheet, injecting an electrolyte into the battery case, and sealing the battery case by thermal welding, a thermally welded portion (a sealed portion) may be contaminated by the electrolyte, and it is difficult to maintain a completely sealed state even after thermal welding due to excessive welding of the innermost resin layer of the laminate sheet and/or outward protrusion of the inner resin layer caused by pressurization. As a result, moisture may easily permeate into the battery case, and the electrolyte may leak from the battery case.

In addition, for the pouch-shaped battery, an insulation breakdown phenomenon may occur due to exposure of the metal layer at the end of the laminate sheet of the battery case, and moisture may penetrate into the battery case through the thermally welded portion of the end of the laminate sheet of the battery case.

In connection with this case, conventional batteries are disclosed in which a PET label or tape is attached to the outer edge of the thermally welded portion to achieve insulation. In a case in which the outer edge of the thermally welded portion is insulated using the PET label or tape, however, the label or the tape may be separated from the outer edge of the thermally welded portion, or air bubbles or wrinkles may formed in the PET label or tape.

Korean Patent Application Publication No. 2001-0078364 discloses a pouch-shaped battery in which an ultraviolet (UV) curable agent, as an auxiliary sealing agent, is applied to an outer edge of a thermally welded portion and is then cured, thereby improving sealability of the battery. However, it is not easy to apply the UV curable agent, which has predetermined viscosity and mobility, to the outer edge of the thermally welded portion, which is thin in vertical section, and the UV curable agent may run down when UV light is applied to cure the UV curable agent after application of the UV curable agent with the result that an effect of improving sealability of the battery is reduced. In conclusion, the above-described technology is not suitable to be applied to a real mass production process.

In addition, Korean Patent Application Publication No. 2001-0004352 discloses a method of manufacturing a sealed battery including applying a UV curable resin to a gasket sealed portion of a positive electrode cap, a safety valve, a welded portion between the positive electrode cap and a battery case, and a sealed portion of an electrolyte injection port and curing the UV curable resin. However, the above-described technology is applied to a cylindrical battery or a prismatic battery. It is difficult to apply the above-described technology to the pouch-shaped battery having problems in that it is troublesome to apply the curable material, and the curable material may run down at the sealed portions as previously described due to structural characteristics of the pouch-shaped battery.

Therefore, there is a high necessity for a technology that is capable of fundamentally solving problems caused in a case in which a curable agent is used to improve sealability of a thermally welded portion of a pouch-shaped battery and to prevent the occurrence of an insulation breakdown phenomenon.

DISCLOSURE

Technical Problem

Therefore, the present invention has been made to solve the above problems, and other technical problems that have yet to be resolved.

That is, it is an object of the present invention to provide a method of manufacturing a battery cell including perpendicularly bending sealed portions and bringing the bent sealed portions into contact with a side wall of a receiving part, mounting a battery case in a jig provided with a depressed part having a size corresponding to that of the battery case, and injecting a curable material into a space defined between the outer side wall of the receiving part of the battery case and an inner side wall of the depressed part of the jig and curing the injected curable material to form an external appearance of the battery case, thereby preventing moisture from permeating into the sealed portions, which may occur due to repetitive expansion and contraction of a body of the battery during repetitive charge and discharge processes of the battery, preventing an electrolyte from leaking from the battery case, and preventing the occurrence of an insulation breakdown phenomenon, which may occur due to exposure of a metal layer of the battery case.

It is another object of the present invention to provide a method of manufacturing a battery cell that is capable of simplifying a process as compared with conventional labeling process, solving a poor external appearance problem, and easily performing a manufacturing process with an increased yield rate and a high quality rate.

Technical Solution

In accordance with one aspect of the present invention, the above and other objects can be accomplished by the provision of a method of manufacturing a battery cell having a structure in which an electrode assembly including a positive electrode, a separator, and a negative electrode is mounted in a battery case, and the battery case is sealed by thermal welding, the method including (a) mounting the electrode assembly in a receiving part of the battery case and forming sealed portions at an outer edge of the receiving part by thermal welding, (b) perpendicularly bending the sealed portions and bringing the bent sealed portions into contact with an outer side wall of the receiving part, (c) mounting and fixing the battery case processed at step (b) in a jig provided with a depressed part having a size corresponding to that of the battery case, and (d) injecting a curable material into a space defined between the outer side wall of the receiving part of the battery case and an inner side wall of the depressed part of the jig and curing the injected curable material.

According to the method of manufacturing the battery cell of the present invention, the battery cell is mounted in the jig provided with the depressed part having the size corresponding to that of the battery case in a state in which the sealed portions are perpendicularly bent and brought into contact with the side wall of the receiving part, and the curable material is injected into a space defined between the outer side wall of the receiving part of the battery case and the inner side wall of the depressed part of the jig and is then cured. Consequently, it is possible to manufacture a battery cell configured to have a structure in which the curable material is stably applied to ends of the sealed portions of the battery case.

The electrode assembly is not particularly restricted so long as a plurality of electrode tabs is connected to constitute a positive electrode and a negative electrode. For example, electrode assembly may be configured to have a wound type structure, a stacked type structure, or a stacked/folded type structure. The details of the stacked/folded type electrode assembly are disclosed in Korean Patent Application Publication No. 2001-0082058, No. 2001-0082059, and No. 2001-0082060, which have been filed in the name of the applicant of the present patent application. The disclosures of the applications are incorporated herein by reference.

In particular, the secondary battery according to the present invention may be preferably applied to a pouch-shaped secondary battery having an electrode assembly mounted in a receiving part of a pouch-shaped battery case made of a laminate sheet, such as an aluminum laminate sheet, including a metal layer and a resin layer.

In a concrete example, the curable material injected at step (d) may be an ultraviolet curable material. In the method of manufacturing the battery cell, the ultraviolet curable material may be injected into the space defined between the outer side wall of the receiving part of the battery case and the inner side wall of the depressed part of the jig and then cured by applying ultraviolet light to the ultraviolet curable material for 3 to 20 seconds. Preferably, Teflon may be coated on the inner side wall of the depressed part of the jig to prevent adhesion between the battery cell and the jig due to the ultraviolet curable material.

The ultraviolet curable material is a material which is cross-linked due to a chemical reaction when ultraviolet light is applied, thereby exhibiting high combining force between molecules. For example, the ultraviolet curable material may be an unsaturated polyester material or polyacrylate material, such as a polyester acrylate, epoxy acrylate, or urethane acrylate. However, the present invention is not limited thereto.

In a concrete example, the ultraviolet curable material may be a material having a hydrophilic function group. In a case in which an ultraviolet curable material having a hydrophilic function group is used, it is possible to collect moisture introduced into the battery, thereby improving sealability and, at the same time, restraining permeation of the moisture.

The ultraviolet curable material may be applied to the corresponding regions in the form of an oligomer having predetermined viscosity or a polymer having small molecular weight and then cured by ultraviolet light.

A general ultraviolet curable agent is a liquid material with low viscosity consisting of a monomer and an oligomer. According to the present invention, however, the ultraviolet curable material is applied to the corresponding regions in the form of oligomer having predetermined viscosity or polymer having small molecular weight and then cured by ultraviolet light. Consequently, the ultraviolet curable material is easily applied, and the ultraviolet curable material is hardly mobile after application of the ultraviolet curable material, thereby achieving an effect of optimally improving sealability of the battery.

According to circumstances, the ultraviolet curable material may be a monomer, which may be applied to the corresponding regions in a state in which a viscosity agent is added to the monomer.

As described above, the ultraviolet curable agent consisting of monomer is a liquid material with low viscosity. For this reason, the ultraviolet curable agent may be applied to the corresponding regions in a state in which a viscosity agent, such as carboxymethyl cellulose, hydroxyethyl cellulose, polyvinyl alcohol, or polyvinylacrylate, which is capable of increasing viscosity of the ultraviolet curable agent is added to the ultraviolet curable agent. Consequently, the ultraviolet curable agent is easily applied, and sealability is improved.

The battery according to the present invention may be preferably applied to a lithium secondary battery, such as a lithium ion secondary battery having an electrode assembly impregnated with an electrolytic solution containing lithium or a lithium ion polymer battery having an electrode assembly impregnated with an electrolytic solution containing lithium in a gel state.

In general, a lithium secondary battery includes a positive electrode, a negative electrode, a separator, and a non-aqueous electrolytic solution containing lithium salt.

The positive electrode may be manufactured, for example, by applying a mixture of a positive electrode active material, a conductive agent, and a binder to a positive electrode current collector and drying the mixture. A filler may be further added to the mixture as needed.

The positive electrode active material may be, but is not limited to, a layered compound, such as a lithium cobalt oxide ($LiCoO_2$) or a lithium nickel oxide ($LiNiO_2$), or a compound replaced by one or more transition metals; a lithium manganese oxide represented by a chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by a chemical formula $LiNi_{1-x}M_xO_2$ (where M=Co, Mn, Al, Cu, Fe, Mg, B, or Ga, and x=0.01 to 0.3); a lithium manganese composite oxide represented by a chemical formula $LiMn_{2-x}M_xO_2$ (where M=Co, Ni, Fe, Cr, Zn, or Ta, and x=0.01 to 0.1) or a chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 1 to 30 weight % based on the total weight of the compound including the positive electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or conductive materials, such as polyphenylene derivatives may be used as the conductive agent.

The binder is a component assisting in binding between the active material and conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler so long as it does not cause chemical changes in a battery to which the filler is applied and is made of a fibrous material. As examples of the filler, there may be used olefin polymers, such as polyethylene and polypropylene; and fibrous materials, such as glass fiber and carbon fiber.

On the other hand, the negative electrode may be manufactured by applying and drying a negative electrode active material to a negative electrode current collector. The above-described components may be selectively added to the negative electrode active material as needed.

As the negative electrode active material, for example, there may be used carbon, such as non-graphitizing carbon or a graphite-based carbon; a metal composite oxide, such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \le x \le 1$; $1 \le y \le 3$; $1 \le z \le 8$); lithium metal; lithium alloy; silicon-based alloy; tin-based alloy; metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; conductive polymer, such as polyacetylene; or a Li—Co—Ni based material.

The separator is interposed between the positive electrode and the negative electrode. As the separator, for example, an insulative thin film exhibiting high ion permeability and high mechanical strength may be used. The separator generally has a pore diameter of 0.01 to 10 μm and a thickness of 5 to 300 μm. As the material for the separator, for example, a sheet or non-woven fabric made of olefin polymer, such as polypropylene, which exhibits chemical resistance and hydrophobicity, glass fiber, or polyethylene is used. In a case in which a solid electrolyte, such as polymer, is used as an electrolyte, the solid electrolyte may also function as the separator.

The non-aqueous electrolytic solution containing lithium salt is composed of a polar organic electrolytic solution and lithium salt. As the electrolytic solution, a non-aqueous liquid electrolytic solution, an organic solid electrolyte, or an inorganic solid electrolyte may be used.

As examples of the non-aqueous liquid electrolytic solution, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. According to circumstances, in order to impart incombustibility, the non-aqueous electrolytic solution may further include halogen-containing solvents, such as carbon tetrachloride and ethylene trifluoride. Furthermore, in order to improve high-temperature retention characteristics, the non-aqueous electrolytic solution may further include carbon dioxide gas.

In accordance with another aspect of the present invention, there is provided a battery cell manufactured using the method as described above.

The secondary battery may be used as a battery cell which is used as a power source of a small-sized device. In addition, the secondary battery may be preferably used as a unit cell of a battery pack including a plurality of battery cells used as a power source of a device.

In a preferred example, the device may be a laptop computer, a mobile phone, a portable display player (PDP), a portable multimedia player (PMP), an MP3 player, a digital still camera (DSC), a digital video recorder (DVR), a smartphone, a global positioning system (GPS), or a camcorder. However, the present invention is not limited thereto.

BRIEF DESCRIPTION OF DRAWINGS

The above and other objects, features and other advantages of the present invention will be more clearly understood from the following detailed description taken in conjunction with the accompanying drawings, in which:

FIG. 1 is an exploded perspective showing a general structure of a conventional pouch-shaped battery;

FIG. 2 is a sectional view showing a structure in which a sealed portion of a battery case is in contact with a side wall of a receiving part in a battery cell according to an embodiment of the present invention;

FIG. 3 is a typical view showing a structure in which the battery cell of FIG. 2 is mounted and fixed in a jig;

FIG. 4 is an enlarged view showing a region A of FIG. 3; and

FIG. 5 is a typical view showing a battery cell according to an embodiment of the present invention.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

FIG. 2 is a sectional view typically showing a structure in which a sealed portion of a battery case is in contact with a side wall of a receiving part in a battery cell according to an embodiment of the present invention.

Referring to FIG. 2, a battery cell 100 is manufactured through a predetermined process of mounting an electrode assembly (not shown) having a positive electrode/separator/negative electrode structure in a receiving part 112 of a first sheet type case 110 and then coupling a second sheet type case 120 to the first sheet type case 110 by thermal welding. The first sheet type case 110 and the second sheet type case 120 may be formed using a single member. Alternatively, the first sheet type case 110 and the second sheet type case 120 may be formed using two individual members. During thermal welding, sealed portions 130 and 140 are formed at the outer edge of the receiving part 112.

Subsequently, the opposite sealed portions 130 and 140 are bent at regions adjacent to the receiving part 112 and are then brought into contact with a side wall **112*a*** of the receiving part.

FIG. 3 is a typical view showing a structure in which the battery cell of FIG. 2 is mounted and fixed in a jig, and FIG. 4 is an enlarged view showing a region A of FIG. 3.

Referring first to FIG. 3, the battery cell 100 of FIG. 2 is mounted and fixed in a jig 160 provided with a depressed part having a size corresponding to that of the battery cell 100. The size of the depressed part of the jig 160 may be variously changed based on the battery cell 100.

Referring now to FIG. 4, a curable material 170 is injected into a space defined between an outer side wall 150 of the battery cell 100 and an inner side wall 161 of the depressed part of the jig 160 and is then cured. As a result, an external appearance part of the battery cell 100 is formed.

Teflon is coated on the inner side wall 161 of the depressed part of the jig 160 to prevent adhesion between the battery cell 100 and the jig 160 due to the curable material.

The curable material 170 is injected such that the curable material 170 is applied to an end of each of the sealed portions of the battery cell 100. An injection amount of the curable material 170 is controlled such that the curable material 170 is injected up to the thickness of the battery cell 100.

In the battery cell 100 having the above-described structure, the curable material 170 is partially applied to the ends of the sealed portions of the battery cell 100 and, at the same time, is injected into the space defined between the outer side wall 150 of the battery cell 100 and the inner side wall 161 of the depressed part of the jig 160 such that the curable material 170 fully surrounds the outer side wall 150 of the battery cell 100, and is then cured. As a result, the curable material 170 may form an external appearance part 180 of the battery cell 100.

As shown in FIG. 5, therefore, a curable material is applied to an outer side wall of a battery cell 200, which is bent and brought into right contact with a side wall of a receiving part. As a result, it is possible to easily perform a process of manufacturing the battery cell. In addition, the curable material, which is mobile, is stably applied to the battery cell 200 and then cured without running down in a state in which the battery cell 200 is mounted in a jig. As a result, external appearance parts 181 and 182 of the battery cell 200 are formed, thereby improving a yield rate of production and efficiency of a manufacturing process.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, in a method of manufacturing a battery cell according to the present invention, the battery cell is mounted in a jig provided with a depressed part having a size corresponding to that of a battery case in a state in which sealed portions are perpendicularly bent and brought into contact with a side wall of a receiving part, and a curable material is injected into a space defined between an outer side wall of a receiving part of the battery case and an inner side wall of the depressed part of the jig and is then cured. As a result, an external appearance part of the battery case is formed. Consequently, it is possible to manufacture a battery cell configured to have a structure in which the curable material is stably applied to ends of the sealed portions of the battery case.

The invention claimed is:

1. A method of manufacturing a battery cell having a structure in which an electrode assembly comprising a positive electrode, a separator, and a negative electrode is mounted in a battery case, and the battery case is sealed by thermal welding, the method comprising:

(a) mounting the electrode assembly in a receiving part of the battery case and forming sealed portions at an outer edge of the receiving part by thermal welding;

(b) perpendicularly bending the sealed portions and bringing the bent sealed portions into contact with an outer side wall of the receiving part;

(c) mounting and fixing the battery case processed at step (b) in a jig provided with a depressed part having a size corresponding to that of the battery case such that the jig has an open top; and (d) injecting a curable material into a space defined between the outer side wall of the receiving part of the battery case and an inner side wall of the depressed part of the jig and curing the injected curable material, wherein the open top of the jig remains open during injection of the curable material at step (d).

2. The method according to claim 1, wherein the electrode assembly is configured to have a folded type structure, a stacked type structure, or a stacked/folded type structure.

3. The method according to claim 1, wherein the battery case is made of a laminate sheet comprising a resin layer and a metal layer.

4. The method according to claim 3, wherein the laminate sheet is an aluminum laminate sheet.

5. The method according to claim 1, wherein polytetrafluoroethylene is coated on an inner surface of the depressed part of the jig.

6. The method according to claim 1, wherein the curable material is injected such that the curable material is applied to an end of each of the sealed portions.

7. The method according to claim 1, wherein the curable material is injected to a height corresponding to a thickness of the battery case or less.

8. A method of manufacturing a battery cell having a structure in which an electrode assembly comprising a positive electrode, a separator, and a negative electrode is mounted in a battery case, and the battery case is sealed by thermal welding, the method comprising:

(a) mounting the electrode assembly in a receiving part of the battery case and forming sealed portions at an outer edge of the receiving part by thermal welding;

(b) perpendicularly bending the sealed portions and bringing the bent sealed portions into contact with an outer side wall of the receiving part;

(c) mounting and fixing the battery case processed at step (b) in a jig provided with a depressed part having a size corresponding to that of the battery case such that the jig has an open top; and (d) injecting a curable material into a space defined between the outer side wall of the receiving part of the battery case and an inner side wall of the depressed part of the jig and curing the injected curable material, wherein the curable material injected at step (d) is an ultraviolet curable material, and the curable material is cured by applying ultraviolet (UV) light to the curable material, and wherein the open top of the jig remains open during injection of the curable material at step (d).

9. The method according to claim 8, wherein the ultraviolet curable material is a material having a hydrophilic function group.

10. The method according to claim 8, wherein the ultraviolet curable material is an unsaturated polyester material or polyacrylate material.

11. The method according to claim 8, wherein the ultraviolet curable material is injected in a form of an oligomer having predetermined viscosity or a polymer having small molecular weight and is then cured by UV light.

12. The method according to claim 8, wherein the ultraviolet curable material is a monomer, which is injected in a state in which a viscosity agent is added to the monomer.

13. The method according to claim 8, wherein the ultraviolet curable material is cured by applying UV light to the ultraviolet curable material for 3 to 20 seconds.

14. A battery cell manufactured using a method according to claim 1.

15. A battery pack comprising one or more battery cells according to claim 14.

16. A device using a battery pack according to claim 15 as a power source.

17. The device according to claim 16, wherein the device is selected from a group consisting of a laptop computer, a mobile phone, a portable display player (PDP), a portable multimedia player (PMP), an MP3 player, a digital still camera (DSC), a digital video recorder (DVR), a smart-phone, a global positioning system (GPS), and a camcorder.

* * * * *